United States Patent
Miessmer

(10) Patent No.: US 9,644,773 B2
(45) Date of Patent: May 9, 2017

(54) HOSE CLAMP

(75) Inventor: Stefan Miessmer, Zurich (CH)

(73) Assignee: Oetiker Schweiz AG (CH)

( * ) Notice: Subject to any disclaimer, the term of this patent is extended or adjusted under 35 U.S.C. 154(b) by 371 days.

(21) Appl. No.: 14/241,925

(22) PCT Filed: Sep. 6, 2011

(86) PCT No.: PCT/EP2011/004482
§ 371 (c)(1),
(2), (4) Date: Apr. 11, 2014

(87) PCT Pub. No.: WO2013/034162
PCT Pub. Date: Mar. 14, 2014

(65) Prior Publication Data
US 2014/0215768 A1    Aug. 7, 2014

(51) Int. Cl.
*F16L 33/035* (2006.01)
*F16L 33/08* (2006.01)

(52) U.S. Cl.
CPC ............ *F16L 33/08* (2013.01); *F16L 33/035* (2013.01); *Y10T 24/1427* (2015.01)

(58) Field of Classification Search
CPC ..... F16L 33/035; F16L 33/08; Y10T 24/1427; Y10T 24/1457; Y10T 24/1459; Y10T 24/1461; Y10T 24/1463; B65D 63/10
See application file for complete search history.

(56) References Cited

U.S. PATENT DOCUMENTS

| | | | |
|---|---|---|---|
| 1,804,725 A | 5/1931 | Walker | |
| 3,078,532 A | 2/1963 | Bywater | |
| 3,214,808 A * | 11/1965 | Litwin | B65D 63/1072 24/16 PB |
| 4,008,512 A * | 2/1977 | Prodel | F16L 3/2334 24/16 PB |
| 4,053,965 A | 10/1977 | Marchou | |
| 4,183,120 A * | 1/1980 | Thorne | B25B 25/005 24/16 R |
| 4,543,691 A * | 10/1985 | Calmettes | F16L 33/02 24/20 EE |
| 4,951,362 A * | 8/1990 | Denemark | B65D 63/1072 24/16 PB |

OTHER PUBLICATIONS

Search Report for International Patent Application No. PCT/EP2011/004482; May 4, 2012.

* cited by examiner

*Primary Examiner* — Abigail Morrell
(74) *Attorney, Agent, or Firm* — Barnes & Thornburg LLP

(57) ABSTRACT

To close and tension a hose clamp, the two end portions of a clamping band, which overlap one another, are provided on surfaces that face one another and have toothed areas which are held in reciprocal engagement by a holding device. The toothed area of one end portion is formed on the outer face of a tongue, the width of the tongue being less than the full width of the band. The holding device has a raised area that is formed in the other end portion and bears the other toothed area on the inner face thereof. The raised area begins spaced from the free end of the other end portion with an outwardly projecting step that has an opening for the tongue to pass through.

13 Claims, 2 Drawing Sheets

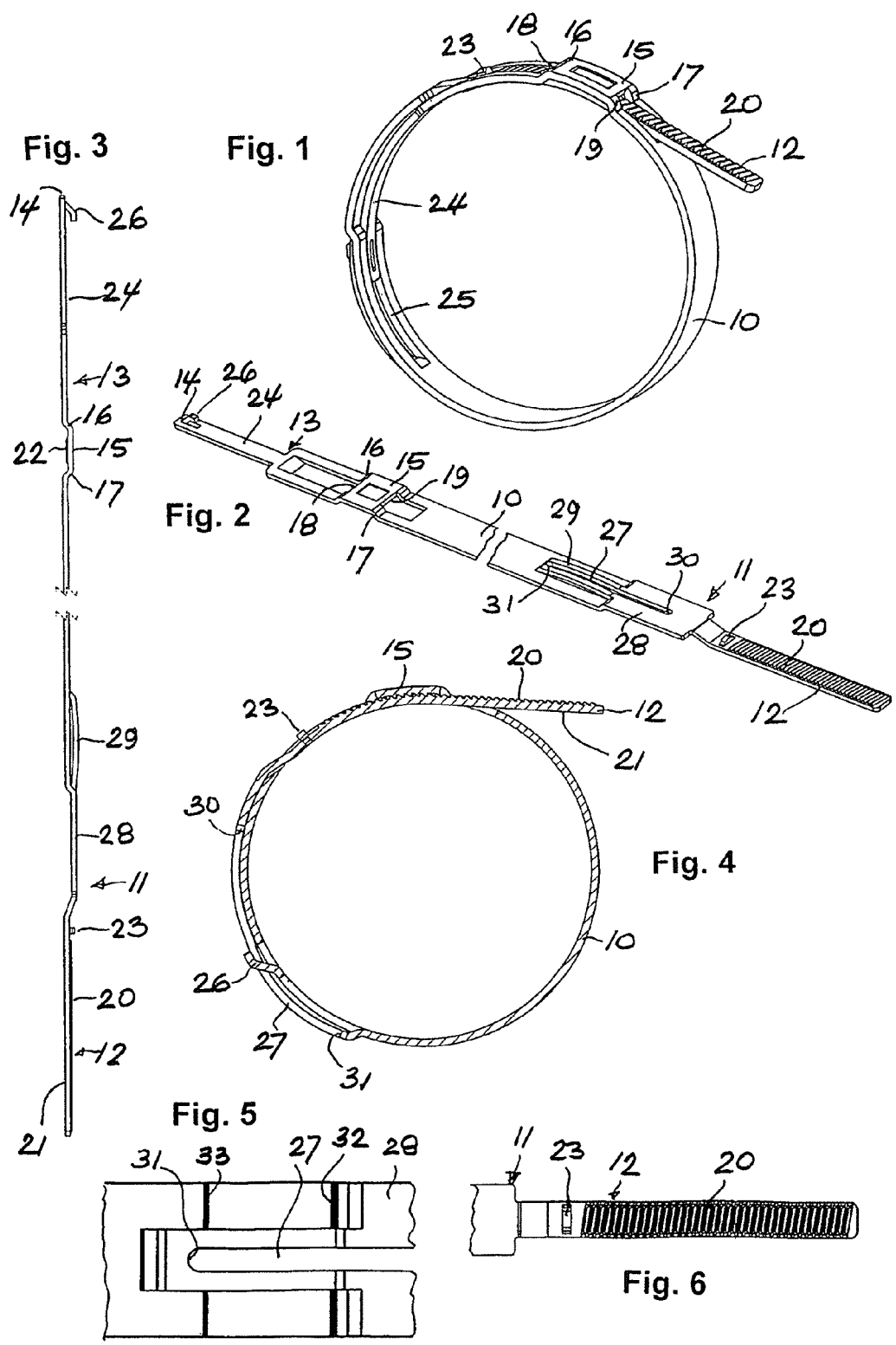

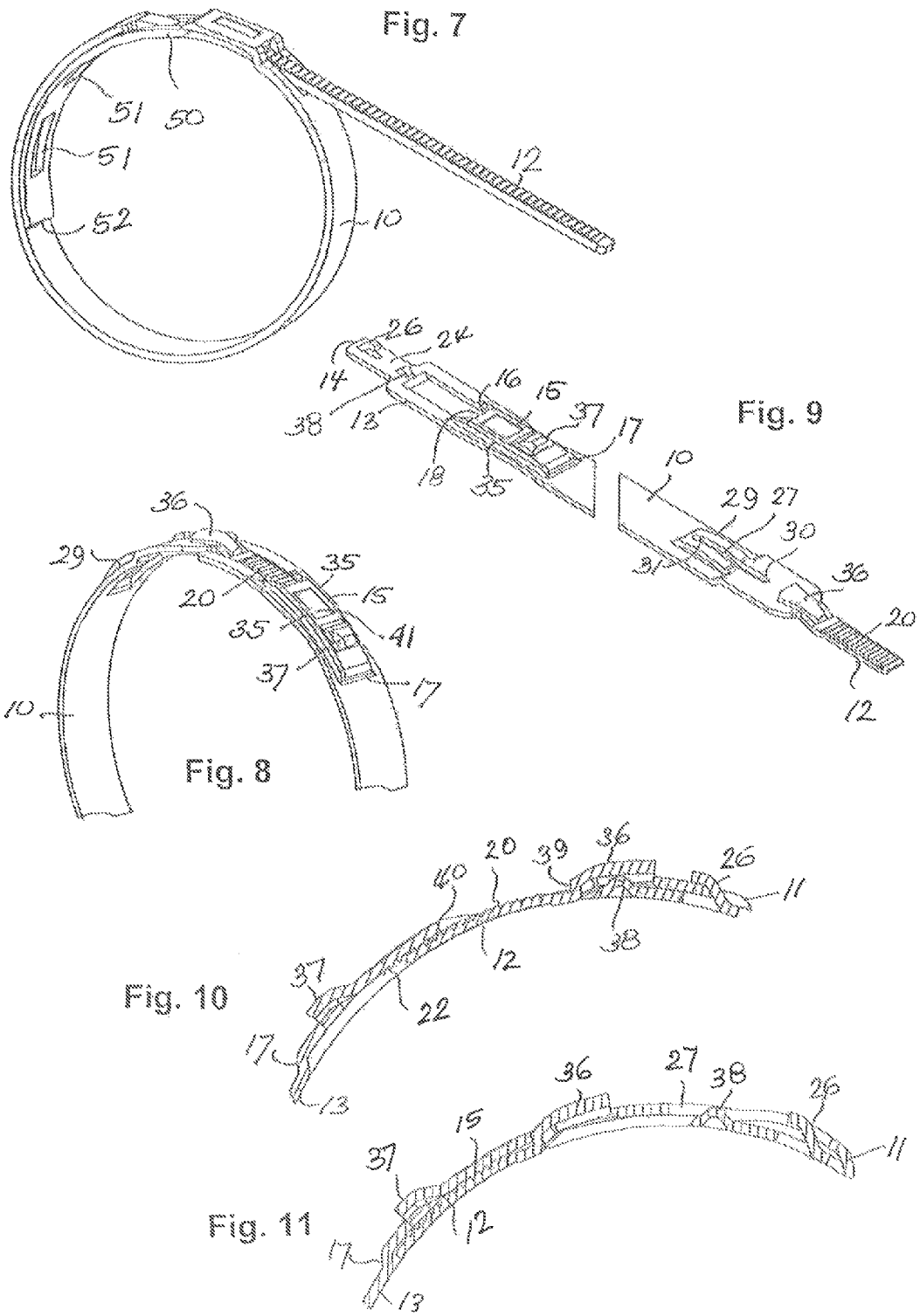

HOSE CLAMP

PRIORITY CLAIM

This patent application is a U.S. National Phase of International Patent Application No. PCT/EP2011/004482, filed 6 Sep. 2011, the disclosure of which is incorporated herein by reference in its entirety.

BACKGROUND

An open hose clamp, in which both end portions of the clamping band have toothed sections for mutual engagement in the overlapping condition, is known from U.S. Pat. No. 4,053,965. To hold the end portions in engagement, it is considered to provide a clip or the like, which is not explained in detail.

U.S. Pat. No. 3,078,532 discloses such a clip which surrounds like a ring both ends of a clamping band which in this case is toothed throughout. Such a ring-shaped clip constitutes an additional structural part, which may be lost and which renders the mounting process more difficult. Moreover, the clip projects from the internal surface of the clamp and is, therefore, problematic with regard to the tightness of the connection.

U.S. Pat. No. 1,804,725 discloses a hose clamp in which one of the toothed sections is provided on the outer side of a tongue, the other on the inner side of a raised portion which has an opening for inserting the tongue in the circumferential direction of the clamp. The raised portion has a web which forms an inner limitation for the inserting opening and lies between the tongue and the hose to be clamped. The web constitutes an unevenness at the inner side of the hose clamp facing the hose and is, therefore, suited for relatively thick and soft hoses only. The web also creates a spacing between the tongue and the hose, which must be overcome when the clamp is tightened.

In the known hose clamp, the tongue is toothed also at its underside so that considerable frictional forces occur upon tightening, which tend to entrain the hose circumferentially. Deformations caused thereby in the hose can lead to leaks between the hose and the underlying object such as a nipple.

SUMMARY

Disclosed embodiments overcome shortcomings of comparable prior-art hose clamps. Disclosed embodiments provide a hose clamp which is easy to close and tighten and which has a smooth internal surface throughout its circumference to reduce the danger of leaks.

Disclosed embodiment provide a hose clamp wherein the tongue, which is toothed at its outer side, extends though an aperture formed in a web provided in the other end portion of the clamping band. This avoids the clip or web required in the prior art, thereby enabling a smooth internal surface free of projections and gaps throughout the circumference and avoiding leaks.

BRIEF DESCRIPTION OF THE DRAWINGS

Embodiments of the invention will be described in more detail below with reference to the drawings, in which:

FIG. 1 is a perspective view of a hose clamp in accordance with a first embodiment shown in its closed but not yet tightened condition;

FIGS. 2 and 3 are a perspective view and, respectively, a side view of the hose clamp of FIG. 1 in its straight condition;

FIG. 4 is a side view of the hose clamp of FIG. 1 in its closed but not yet tightened condition;

FIG. 5 is an enlarged view of a portion of the hose clamp shown in FIGS. 1 to 4;

FIG. 6 is a plan view of the tongue of the hose clamp in accordance with accordance with another variation;

FIG. 7 is a perspective view similar to FIG. 1 of a hose clamp in accordance with a second embodiment shown in its closed but not yet tightened condition;

FIG. 8 is a perspective view again similar to FIG. 1 of a hose clamp in accordance with a third embodiment shown in its closed but not yet tightened condition;

FIG. 9 is a perspective view similar to FIG. 2 of the hose clamp of FIG. 8 in its straight condition; and FIGS. 10 and 11 are side views of the hose clamp of FIGS. 8 and 9, shown in its closed but not yet tightened condition.

DETAILED DESCRIPTION OF THE DISCLOSED EMBODIMENTS

Illustrative embodiments provide a hose clamp wherein the tongue, which is toothed at its outer side, extends though an aperture formed in a web provided in the other end portion of the clamping band. This avoids the clip or web required in the prior art, thereby enabling a smooth internal surface free of projections and gaps throughout the circumference and avoiding leaks.

In the disclosed embodiments, no gap can form under the raised portion in the tightened condition of the clamp so that the hose is pressed against the underlying object also in this area, and leaks are avoided.

In the disclosed embodiments, any gap is avoided at the end of the clamping band portion provided with the raised portion so that the danger of leaks is removed also at this point.

A disclosed embodiment serves as a lateral guide of the inner clamping band end in such a manner that this end is prevented from escaping laterally at the time the clamp is closed and tightened. A disclosed embodiment permits the clamping band ends to hook into one another in the not yet tightened condition, thereby facilitating the engagement of a tightening tool.

A disclosed embodiment permits the tightened condition of the hose clamp to be visually detected.

The disclosed embodiments are useful for engaging a tightening tool which may be shaped as a pair of pliers. In this connection, a disclosed embodiment of is beneficial in that it avoids the danger of the hose being damaged by the tightening tool. In a disclosed embodiment, one of the tightening means also acts as a protection against buckling. In a further disclosed embodiment, it serves also as a stop for limiting the closing movement of the hose clamp.

A disclosed embodiment is particularly suited for airbags, wherein the apertures provided in the inner clamping band portion effect an anchoring in the airbag material.

In a disclosed embodiment, the hose clamp is suited for tightening means using a worm gear.

The hose clamp shown in FIGS. 1 to 4 consists of a clamping band 10 the first end portion 11 of which terminates in a first tongue 12 having a width smaller than the full width of the clamping band 10. The second end portion 13 has a raised portion 15 spaced from the free end 14 which, as viewed from the end 14, starts with an outward projecting first step 16 and terminates with an inward returning second step 17 which is symmetrical to the first step 16. The height of the steps 16, 17 is substantially equal to the thickness of the clamping band 10. The first step 16 has an aperture 18 and the second step 17 has an aperture 19 for passing the tongue 12. FIG. 1 shows the hose clamp in a pre-bent, closed but not yet tightened condition in which the tongue 12 extends through the apertures 18 and 19.

The outer side of the tongue 12 is provided with a toothed section 20 the teeth of which are shaped like saw teeth having one side substantially perpendicular to the band surface and one inclined side which faces the tip of the tongue 12. The surface 21 of the tongue 12, which is the radially inner surface with respect to the curved hose clamp, is smooth.

As shown in FIGS. 3 and 4, the second end portion 13 has a toothed section 22 at its inner surface within the raised portion 15. The teeth of the toothed section 22 are also saw-tooth shaped having one side substantially perpendicular to the band surface and one inclined side facing the free end 14. The pitch of the teeth of the toothed section 22 may be twice or a multiple of that of the teeth of the toothed section 20 of the tongue 12. It is advantageous to make the pitch of the toothed section 20 of the tongue as small as possible to enable the diameter of the hose clamp to be brought to the desired value upon tightening as closely as possible.

The hose clamp shown in FIGS. 1 to 4 is axially positioned or is opened and placed around the object to be tightened, such as a nipple surrounded by a hose, whereupon the tongue 12 is fed through the apertures 18 and 19 with the toothed sections 20, 22 catching one another. During the subsequent tightening, the tongue 12 moves further through the apertures 18, 19. At the same time, the toothed section 22 of the second band end portion 13 between the steps 16 and 17 is pressed against the toothed section 20 of the tongue 12. This prevents unintentional opening of the hose clamp.

Tightening can be done by means of a tightening tool (not shown) the tightening elements of which bear at the second step 17, on the one hand, and pull on the tongue 12, on the other hand. Alternatively, it is possible to provide recesses at suitable locations of both end portions 11, 13 for engagement of pointed ends of a pair of pliers (similar to circlip pliers), or to provide a tightening hook on the raised portion 15 for engagement of pliers (similar to cable strap pliers).

The second end portion 13 of the clamping band 10 terminates in a second tongue 24 which is narrower than the clamping band 10. The tongue 24 is received by a channel 25 provided in the first end portion 11 and carries at its outer end a guide hook 26 which is open in the direction of the first end portion 11. As shown in FIG. 4, the guide hook 26, in the closed and tightened condition of the hose clamp, extends through a guide slot 27 which is formed in an outward bent portion 28 of the first end portion 11 adjacent to the inner end of the first tongue 12 and in an adjacent cover 29 of the channel 25 which is bent outward from the clamping band 10. The cover 29 prevents the tongue 24 from projecting outward from the hose clamp.

In the closed condition, the hose clamp seeks to open due to its inherent tension. This is prevented by the fact that the guide hook 26 catches the end 30 of the guide slot 27 adjacent to the first tongue 12. With the mounted hose clamp being thus retained in its closed condition, the subsequent tightening process may be performed without problems.

FIG. 5 shows an enlarged part of the clamping band 10 in the area of the end 31 of the guide slot 27 remote from the first end portion 11. With proper clamp size and tension, the guide hook 26 should be between the marks 32 and 33 provided at in this area. This permits a visual check of the clamp tension.

As shown in FIG. 6, and different from FIGS. 1 and 2, the toothed section 20 of the first tongue 12 can have teeth extending at an angle to the longitudinal axis of the clamping band 10. In this disclosed embodiment, the hose clamp is suited for tightening means using a worm gear (not shown).

The disclosed embodiment of FIG. 7 differs from that of FIGS. 1 to 4 in that the second end portion 50 has the full width of the clamping band throughout and is provided with a number of apertures 51. This disclosed embodiment is suited for, e.g., air bags where the apertures 51 may catch in the relatively soft fabric of the air bag. Further, the formations 27 . . . 31 in the first end portion shown in FIG. 2 are omitted so that the end 52 of the second end portion 50 forms a step inside the closed hose clamp.

The further disclosed embodiment shown in FIGS. 8 to 11 differs from those of FIGS. 1 to 6 by a shorter length of the tongues 12 and 24. Further, the raised portion 15 has lateral webs 35 between both steps 16, 17 which, in the closed condition and in the tightened condition of the hose clamp, are disposed on both sides of the tongue 12. The laterally closed cage thus formed increases the surface pressure exerted by the hose clamp on the hose in the area of the tongue 12.

The step 17 may be closed if the first tongue 12 is short. With greater tongue lengths or to permit larger diameter reductions of the hose clamp, the step is provided with an aperture, as in the disclosed embodiments of FIGS. 1 to 7, through with the tongue 12 can extend to avoid friction.

To tighten this hose clamp, a slightly outward projecting tightening tunnel 36 is formed on the part of the clamping band 10 adjacent to the first tongue 12, and an outward projecting tightening hook 37 is formed on the raised portion 15 between the first and second steps 16, 17 of the second end portion 13. A pliers-type tightening tool may engage this tunnel 36 and hook 37. The tightening tunnel 36 overlaps the step between the first tongue 12 and adjacent part of the clamping band 10 to constitute a protection against buckling.

As further shown in FIGS. 9 to 11, a nose 38 pressed out of the camping band 10 may be provided on the second tongue 24 at a location further remote from the end 14 of the second end portion 13 than the guide hook 26. The nose 38, in co-operation with the internal surface of the tightening tunnel 36, prevents an inadvertent diameter reduction of the hose clamp during transport; see FIG. 10.

As appears form FIGS. 10 and 11, the end of the tightening tunnel 36 remote from the first tongue 12 forms a ledge 39 which co-operates with an edge 40 of a window 41 cut out of the second end portion 13 to limit the closing movement.

The disclosed embodiments explained with reference to FIGS. 5 and 6 (marking lines, oblique teeth) may be provided also in the disclosed embodiment of FIGS. 8 to 11. Likewise, disclosed embodiments explained with reference to FIGS. 9 and 11 for limiting the closing movement and preventing an inadvertent diameter reduction are applicable also to the disclosed embodiments of FIGS. 1 to 6. Further, The disclosed embodiment explained with reference to FIGS. 8 and 11 (cage) for increasing the surface pressure exerted on the object being clamped is also applicable to the disclosed embodiment of FIGS. 1 to 6.

REFERENCE NUMBERS 10 clamping band
11 first end portion 12 first tongue
13 second end portion
14 end (of 13)
15 raised portion
16 first step
17 second step
18, 19 apertures
20 toothed section
21 inner surface
22 toothed section
23 projection
24 second tongue
25 channel
26 guide hook
27 guide slot
28 bent portion
29 cover
30, 31 end of guide slot
32, 33 marks
35 webs
36 tightening tunnel
37 tightening hook
38 nose
39 ledge
40 edge
41 window
50 second end portion
51 apertures
52 end (of 50)

The invention claimed is:

1. A hose clamp comprising:
a clamping band having first and second band ends which, in a mounted condition, form mutually overlapping first and second end portions having toothed sections at mutually facing surfaces; and
retaining means holding the toothed sections in mutual engagement, wherein the toothed section of the first end portion is formed at an outer side of a first tongue which has a width smaller than a full band width, and the retaining means has a raised portion formed in the second end portion, the raised portion carrying at its inner side the other toothed section and forming an opening facing in a circumferential direction for passing the first tongue,
wherein the raised portion starts with a first outward extending step spaced from the second band end, the step having a height corresponding to the thickness of the clamping band, and the opening passing the first tongue is an aperture in the first step, and
wherein the second end portion has a second tongue of a width smaller than the full band width, and the first end portion has a channel for receiving the second tongue.

2. The hose clamp of claim 1, wherein the retaining means has, on the side of the first step remote from the second band end, an inward projecting second step with an aperture for passing the first tongue.

3. The hose clamp of claim 1, wherein the retaining means has, on a side of the first step remote from the second band end, an inward projecting second step, and an area between the two steps forms lateral webs which lie on both sides of the first tongue in the mounted condition of the hose clamp.

4. The hose clamp of claim 1, wherein the channel is provided with an outer cover.

5. The hose clamp of claim 4, wherein the cover has a guide slot for an outward extending projection provided on the second tongue.

6. The hose clamp of claim 5, wherein the projection forms a hook facing away from the second band end for engaging an end of the guide slot facing the first band end.

7. The hose clamp of claim 5, further comprising marks at the guide slot for visually detecting the tightening condition of the hose clamp.

8. The hose clamp of claim 1, wherein each end portion has means for engagement by a tightening tool.

9. The hose clamp of claim 8, wherein the means for engagement by a tightening tool are outward extending projections.

10. The hose clamp of claim 9, wherein the second end portion has a second tongue of a width smaller than the full band width, and the first end portion has a channel for receiving the second tongue, and wherein the projections are formed in parts of the clamping band which overly a respective tongue in a tightened condition of the clamp.

11. The hose clamp of claim 9, wherein the second end portion has a second tongue of a width smaller than the full band width, and the first end portion has a channel for receiving the second tongue, and wherein one of the projections overlaps a step existing between the first tongue and an adjacent part of the clamping band.

12. The hose clamp of claim 9, wherein the second end portion has a second tongue of a width smaller than the full band width, and the first end portion has a channel for receiving the second tongue, and wherein the projection formed in one of the clamping band parts has a ledge which co-operates with an edge in the other clamping band part for limiting a closing movement.

13. The hose clamp of claim 1, wherein the toothed sections have teeth extending obliquely with respect to a longitudinal axis of the clamping band.

* * * * *